United States Patent
Jaramillo et al.

(10) Patent No.: US 10,914,300 B2
(45) Date of Patent: Feb. 9, 2021

(54) SYSTEMS AND METHODS FOR MANAGING HEAT TRANSFER IN A PRESSURE WASHER

(71) Applicant: KARCHER NORTH AMERICA, INC., Denver, CO (US)

(72) Inventors: Hector Valdez Jaramillo, Aurora, CO (US); Eric L. Shark, Littleton, CO (US); Adam Bearup, Lakewood, CO (US)

(73) Assignee: KARCHER NORTH AMERICA, INC., Denver, CO (US)

( * ) Notice: Subject to any disclaimer, the term of this patent is extended or adjusted under 35 U.S.C. 154(b) by 48 days.

(21) Appl. No.: 15/933,814

(22) Filed: Mar. 23, 2018

(65) Prior Publication Data

US 2018/0272392 A1  Sep. 27, 2018

Related U.S. Application Data

(60) Provisional application No. 62/476,069, filed on Mar. 24, 2017.

(51) Int. Cl.
*F04B 49/035* (2006.01)
*F04B 49/24* (2006.01)
(Continued)

(52) U.S. Cl.
CPC ............ *F04B 49/035* (2013.01); *F04B 17/05* (2013.01); *F04B 17/06* (2013.01); *F04B 23/02* (2013.01); *F04B 49/24* (2013.01); *F04B 53/08* (2013.01); *F04D 29/5873* (2013.01); *G05D 23/1951* (2013.01); *B08B 3/026* (2013.01); *B08B 2203/007* (2013.01); *B08B 2203/0205* (2013.01); *F04D 29/5866* (2013.01); *F28D 1/06* (2013.01)

(58) Field of Classification Search
CPC .... B08B 2203/0205; F16L 53/70; F16L 53/75
USPC ...................... 239/127, 128, 132.5
See application file for complete search history.

(56) References Cited

U.S. PATENT DOCUMENTS 2,913,009 A * 11/1959 Kuthe ................ F28D 7/10
  138/38
3,559,511 A *  2/1971 Schaefer ........... B23Q 11/1046
  408/1 R (Continued)

FOREIGN PATENT DOCUMENTS

WO  WO-2008068490 A1 * 6/2008 ............. B08B 3/026

OTHER PUBLICATIONS

"HN Series Pressure Steamers," Hydro Tek Systems Inc., 2013, 2 pages.

(Continued)

*Primary Examiner* — Robert K Arundale
*Assistant Examiner* — Richard K. Durden
(74) *Attorney, Agent, or Firm* — Sheridan Ross P.C.

(57) ABSTRACT

A pressure washing device is provided with a bypass mode. The device comprises a bypass mode and bypass structure that is in fluid communication with a fluid tank for at least one of storing and cooling a fluid that has been heated to unacceptable levels. The present disclosure further provides various devices and features for managing and mitigating heating and over-heating of fluids and components in communication with the fluids.

18 Claims, 13 Drawing Sheets

(51) Int. Cl.

| | |
|---|---|
| *F04D 29/58* | (2006.01) |
| *F04B 53/08* | (2006.01) |
| *G05D 23/19* | (2006.01) |
| *F04B 17/05* | (2006.01) |
| *F04B 23/02* | (2006.01) |
| *F04B 17/06* | (2006.01) |
| *B08B 3/02* | (2006.01) |
| *F28D 1/06* | (2006.01) |

(56) References Cited

U.S. PATENT DOCUMENTS

| | | | | |
|---|---|---|---|---|
| 3,628,727 | A * | 12/1971 | Gjerde | B05B 7/32 |
| | | | | 239/124 |
| 3,756,466 | A | 9/1973 | Haase | |
| 3,760,982 | A | 9/1973 | Haase | |
| 3,829,024 | A | 8/1974 | Heden | |
| 3,940,065 | A * | 2/1976 | Ware | B05B 5/085 |
| | | | | 239/146 |
| 4,153,968 | A * | 5/1979 | Perkins | A47L 11/34 |
| | | | | 15/321 |
| 4,306,581 | A | 12/1981 | Alandt | |
| 4,435,127 | A * | 3/1984 | Kranzle | F04B 49/06 |
| | | | | 417/26 |
| 4,986,349 | A * | 1/1991 | Ono | F28D 7/103 |
| | | | | 165/154 |
| 5,035,580 | A * | 7/1991 | Simonette | B08B 3/026 |
| | | | | 417/34 |
| 5,230,471 | A | 7/1993 | Berfield | |
| 5,259,556 | A | 11/1993 | Paige et al. | |
| 5,409,032 | A | 4/1995 | Berfield | |
| 5,655,599 | A * | 8/1997 | Kasprzyk | F28F 1/40 |
| | | | | 165/133 |
| 5,662,269 | A * | 9/1997 | Francis | B08B 3/026 |
| | | | | 134/107 |
| 5,979,788 | A * | 11/1999 | Rancourt | B05B 9/0403 |
| | | | | 137/115.13 |
| 8,888,016 | B2 | 11/2014 | Linton et al. | |
| 8,939,382 | B1 * | 1/2015 | Finger | G05D 7/0682 |
| | | | | 122/15.1 |
| 8,955,607 | B2 * | 2/2015 | Whitney, Jr. | F04D 15/0088 |
| | | | | 123/41.09 |
| 10,189,036 | B2 * | 1/2019 | Steffen | B05B 7/22 |
| 2004/0238162 | A1 * | 12/2004 | Seiler | F02M 31/20 |
| | | | | 165/148 |
| 2005/0191183 | A1 * | 9/2005 | Kawakami | F04B 49/02 |
| | | | | 417/34 |
| 2005/0258269 | A1 * | 11/2005 | Schmidt | B29B 7/826 |
| | | | | 239/124 |
| 2006/0081363 | A1 * | 4/2006 | Chissus | F28D 1/0435 |
| | | | | 165/173 |
| 2007/0023391 | A1 * | 2/2007 | Boussier | F24D 3/165 |
| | | | | 216/47 |
| 2007/0267063 | A1 | 11/2007 | Davis | |
| 2009/0143516 | A1 | 6/2009 | MacDonald et al. | |
| 2010/0006668 | A1 | 1/2010 | Alexander et al. | |
| 2010/0018672 | A1 * | 1/2010 | Yang | F28D 7/0008 |
| | | | | 165/104.11 |
| 2011/0036418 | A1 * | 2/2011 | Hendy | B08B 3/02 |
| | | | | 137/335 |
| 2011/0315787 | A1 * | 12/2011 | Linton | B08B 3/026 |
| | | | | 239/124 |
| 2013/0298546 | A1 * | 11/2013 | Ohkubo | F04B 49/002 |
| | | | | 60/487 |
| 2014/0209070 | A1 * | 7/2014 | Gleeson | F02M 21/06 |
| | | | | 123/543 |
| 2015/0306614 | A1 * | 10/2015 | Pierce | B05B 15/58 |
| | | | | 137/12 |
| 2016/0074911 | A1 * | 3/2016 | Dore | B29C 64/35 |
| | | | | 134/56 R |
| 2017/0356438 | A1 * | 12/2017 | Hughes | F04B 17/00 |

OTHER PUBLICATIONS

"Schematic drawing and parts list for Hydro Tek Model No. HN35005E3C," Hydro Tek System, Inc., Jan. 1, 2013, 2 pages.

Official Action for Canadian Patent Application No. 2,743,619 dated Jan. 23, 2013, 3 pages.

Official Action for U.S. Appl. No. 12/821,954 dated Feb. 22. 2013, 12 pages.

Notice of Allowance for U.S. Appl. No. 12/821,954 dated Apr. 3, 2013, 6 pages.

Official Action for U.S. Appl. No. 13/828,672 dated Oct. 16, 2013, 11 pages.

Official Action for U.S. Appl. No. 13/828,672 dated Apr. 28, 2014, 12 pages.

Notice of Allowance for U.S. Appl. No. 13/828,672 dated Sep. 12, 2014, 9 pages.

* cited by examiner

SYSTEMS AND METHODS FOR MANAGING HEAT TRANSFER IN A PRESSURE WASHER

This U.S. Non-Provisional patent application claims the benefit of priority from U.S. Provisional Patent Application Ser. No. 62/476,069, filed Mar. 24, 2017, the entire disclosure of which is hereby incorporated by reference.

FIELD

The present disclosure relates generally to systems, devices and methods for pressure washers. More specifically, the present disclosure and various embodiments disclosed herein relate to pressure washers, including pressure washers with petroleum-based fuel-powered engines and electric motors. Systems and methods provided herein also provide for monitoring, controlling, and managing the temperature of a working fluid and an internal pressure provided within a pressure-washing device.

BACKGROUND

Various pressure washing devices, including portable pressure washers, are known to use one or more reciprocating pistons to apply a positive pressure to a fluid, which is thereafter dispensed via a gun or similar device to perform pressure-washing activities. These devices, which may comprise a pump powered by a gas-powered engine or electric motor. Typically gas-powered devices include a bypass mode wherein the pump is running, but fluid is not being expelled from the system via the gun or similar outlet. In such a condition, water or other working fluid is cycled through the system and repeatedly subjected to the pump. The cycling of the fluid and repeated exposure of the fluid to the pistons of the pump creates a gradual increase in the temperature of the fluid. This increase in temperature is largely due to the creation of friction heat and energy consumption from within the pump, which is transferred to the fluid.

In various applications, heated fluid may be desirable in pressure washing applications, including where solvents and cleaning solutions are used. Such cleaning solutions may be activated or perform better with the increased solubility of fluid that is heated to between approximately 100° and 110° Fahrenheit. However, the cycling of fluid in a bypass state is known to increase the temperature of a fluid well beyond an acceptable limit, which can drastically reduce the life of seals within the device. Indeed, existing devices are known to increase water and component temperatures to unacceptable levels within approximately two or three minutes.

Existing pressure washing devices that comprise a bypass circuit or feature generally fail to properly account for temperature increases in a working fluid. These devices also generally occupy a large amount of space. Accordingly, there has been a long-felt and unmet need to provide methods, systems, and devices of the present disclosure including, for example, pressure washing devices that detect and mitigate issues associated with increased temperatures produced in a bypass operation of a device.

SUMMARY

Embodiments of the present disclosure are directed to pressure washing devices. Various embodiments and features of the present disclosure are contemplated for use with hot and cold water pressure washer devices.

In various embodiments, pressure washing devices of the present disclosure comprise a bypass mode. As used herein, a "bypass", "bypass mode", and/or "bypass circuit" generally refers to device components and the operation of a device in a state where a pump is active and running, but pressurized fluids are not being expelled from the device. For example, devices of various embodiments of the present disclosure comprise a bypass mode through which fluid is recirculated at least when a pump is operational and a spray gun or similar dispensing device is closed. The bypass mode comprises a circuit through which water or fluid is recirculated from a high-pressure outlet of the pump back to a low-pressure inlet of the pump.

In certain embodiments, devices of the present disclosure comprise a tank in fluid communication with a bypass circuit. Tanks of the present disclosure are provided to increase a total volume of the bypass circuit, and to enhance a device's ability to transfer heat from a fluid in a bypass circuit. In some embodiments, tanks of the present disclosure comprise a pass-through device wherein a fluid is allowed to continuously flow through the tank when a bypass mode is active. In such embodiments, the enhanced fluid storage volume and increased surface area provided by the tank serves to increase heat transfer from the fluid before it is returned to a low-pressure inlet of the pump. In alternative embodiments, at least one tank is provided that comprises a temporary fluid storage chamber. In such embodiments, heated fluid is pumped to the tank where it is allowed to remain and cool to a desired temperature before it is returned to the pump or other components of the system. In some embodiments, a fluid filter is provided in at least one of the tank and the bypass line.

Devices of the present disclosure are contemplated as comprising at least one temperature sensor or sensor circuit. A temperature sensor of the present disclosure can include, but not be limited to, thermocouples and thermistors. Temperature sensors of the present disclosure are operable to detect a temperature of at least one of a fluid and a component of the device (e.g. pump manifold). Temperature sensors of the present disclosure are further contemplated as being operable to provide a signal to various portions and components of the devices through a sensor circuit, to control device function and/or provide feedback to a user.

In various embodiments, devices of the present disclosure contemplate a pressure washer having at least one frame member that is operable to support other device components (e.g. a pump and associated engine). In certain embodiments, a frame member comprises an extruded metal member that provides structural support to the device and where at least a portion of the frame member comprises an internal volume through which fluid can be directed during operation of a bypass mode.

In various embodiments, the present disclosure provides a pressure washing device with an extruded frame member and that comprises an internal volume that is operable to store and/or convey fluid. In some embodiments, an extruded tank (e.g. extruded aluminum tank) may also comprise an internal conduit and/or storage volume that provides at least one of storage and heat dissipation to a fluid contained within the tank. In some embodiments, the tank comprises an extruded metal tank frame, with a water tank or conduit, and where a plurality of cooling fins extend from an exterior and/or interior of the metal tank frame.

Although various embodiments of the present disclosure contemplate an extruded metal frame member and/or tank, alternative embodiments contemplate that at least portions of a pressure washer frame or tank are provided as plastic or welded components. In various other embodiments, devices of the present disclosure comprise extruded metal components. For instance, one embodiment of the present disclosure comprises a device constructed of extruded metal, which may allow a user to more easily lift the machine into a car or other vehicle for transport, for example. For ease of manipulation, two horizontal and slightly downward sloping extruded frame members are provided in certain embodiments and those can be of a diameter that is operable to be grasped by a user and therefore make it easier for the user to pick up the machine. Further, the center of gravity of the machine is contemplated as being provided between two pickup points, thereby providing ergonomic enhancements to the disclosed device.

Various pressure washing devices comprise a bypass mode, wherein water or fluid is recirculated when a gun or other dispensing device is provided in a closed position. Embodiments of the present disclosure contemplate the provision of a storage or cooling tank to receive water or fluid that is overheated, and reduce the temperature of the fluid prior to reintroducing the fluid into the working components of the device. Alternative embodiments contemplate a bypass mode wherein overheated water or fluid is expelled from the system. These embodiments may, however, be wasteful and/or damage environments and areas immediately surrounding the device. Embodiments of the present disclosure contemplate the provision of a tank in-line with a bypass path, and wherein the tank increases the overall volume of a bypass path, and receives cold, fresh water to mitigate the heating effects of the pump.

In various embodiments of the present disclosure, a bypass line or circuit is provided wherein fluid in the bypass line or circuit is provided in a low-pressure state. Such embodiments allow an engine or motor and associated pump to run at reduced capacity, and typically at about 5% of their overall capacity. In alternative embodiments, it is contemplated that a bypass line comprises a high-pressure line wherein fluid is maintained under load or pressure. Such embodiments are contemplated with use in hot-water pressure washers, for example, including devices comprising an exhaust-gas heat exchanger wherein a tank and/or bypass line is subject to thermal energy from an exhaust gas from the engine.

While preferred embodiments of the present disclosure contemplate the provision of a tank as a component of a bypass portion, and through which fluid is directed whenever a spray gun or similar device is not operated, various alternative embodiments of the present disclosure comprise a thermal switch. In such alternative embodiments, fluid is diverted from one portion of the pressure washing system if and when the fluid exceeds a set temperature. For example, at least one thermal switch may be provided that is operable to divert water from a bypass line or mode to a cooling tank when the fluid exceeds 150° F. The thermal switch is operable to open at a certain temperature and, for example, provide a current to open a valve which is then operable to divert fluid from a bypass line to a storage tank or other holding and cooling area. In some embodiments, a thermal switch is provided to provide a signal to shut down an engine or electrical motor if and when a fluid has exceeded a predetermined temperature.

In various embodiments, components of the device are provided with an indicator for providing information to a user that at least one portion of the device has reached or exceeded a set temperature. For example, in certain embodiments, it is contemplated that a water tank or bypass section of a pressure washer device is provided with a color-changing indicia that changes color to indicate that a certain temperate has been reached or exceeded. This indicia provides a visual feedback to a user to indicate that some action should or should not be taken (e.g. the device should be powered off and allowed to cool or the device should not be touched with bare skin). Color changing indicia for use with such embodiments include, for example, the devices and features shown and described in U.S. Patent Application Publication No. 2009/0143516, which is hereby incorporated by reference in its entirety. In certain embodiments, the color-changing indicia may be provided or formed in the shape of text or symbols to further enable the conveyance of information to a user. For example, in some embodiments, a color-changing indicia is provided in the shape or form of the word (e.g. "HOT") to clearly convey the intended information.

In some embodiments, devices of the present disclosure comprise at least one Quick Response ("QR") code to indicate to a user that a certain condition has occurred. For example, it is contemplated that certain components (e.g. a pump manifold or a water tank) comprise a heat-activated QR code that appears when the component exceeds a predetermined temperature. The device also may comprise additional heat-activated indicia (e.g. "SCAN HERE") to provide instruction to a user. Scanning the QR code with a QR enabled smartphone or other device is thereafter operable to provide information to a user. For example, the scanning of the QR code may prompt an electronic device, such as a smartphone or tablet, to retrieve explanations and instructions related to the existence of the QR code. The smartphone, tablet, or other device, may be linked to instructions to explain to a user that certain portions of the device have overheated and certain remedial actions should be taken.

In various embodiments, a pump protector (e.g. a thermal switch in communication with a valve) is provided to release water that is overheated. The pump protector may empty water from the system, or may divert hot water to a bypass line and/or storage tank. In certain embodiments, the pump protector is provided as a thermal switch and comprises a whistle or other device that produces an audible sound and that is operable to alert a user of the presence of overheated fluid. For example, in some embodiments, it is contemplated that pressure washers of the present disclosure comprise a steam whistle that is operable to produce a high-pitched noise and thus provide feedback to a user. Embodiments that comprise a thermal switch and/or thermal valve for ejecting overheated water are contemplated as also comprising bypass lines with integrated tank and storage components as shown and described herein.

In various embodiments, an audible indicia or feedback is provided on a pressure washing device to indicate to a user that a temperature of the device and/or fluid provided therein has exceeded a certain temperature. For example, in one embodiment, a steam whistle is provided in combination with a bypass portion of the device and steam may be accelerated through a portion of the device to create a high-pitched noise and indicate to a user that at least a portion of the device or fluid has exceeded an acceptable temperature. In various embodiments, a pressure washer device is provided with a selectively-activated unloader valve. It is known that various positive displacement pumps may be difficult to start if a pressure within the pump chamber is too high. Specifically, it may be difficult or impossible to manually start a device comprising a pump chamber when a pressure within the pump chamber prevents manual movement of the pistons. In such circumstances, it is desirable to relieve the pressure within the chamber prior to attempting to start the machine and in various embodiments, that is accomplished with an user-operated unloader valve. In some embodiments, the unloader valve comprises a foot pedal. It will be recognized, however, that other user interfaces may be provided to operate the unloader valve. For example, triggers, handles, and push-buttons are also contemplated as providing a user-interface or user contact point for manually relieving or unloading the pressure within a pump chamber.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
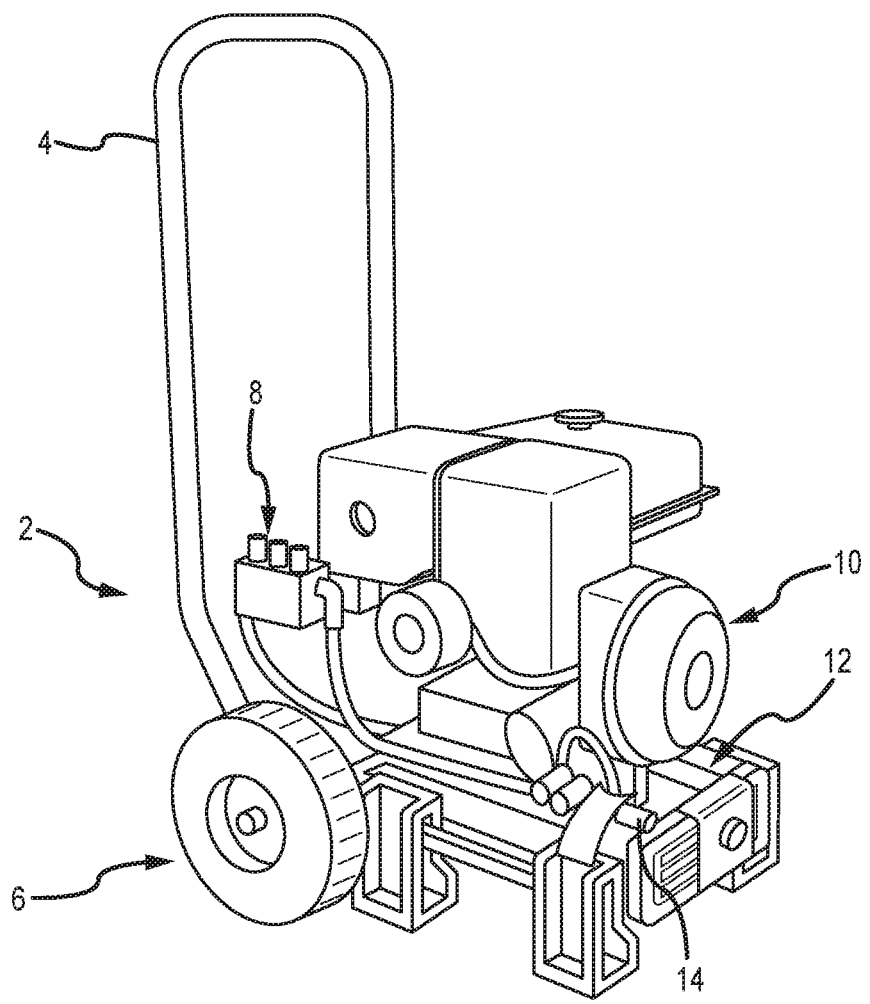

FIG. 1 is a perspective view of a pressure washer according to one embodiment of the present disclosure.

Figure 2:
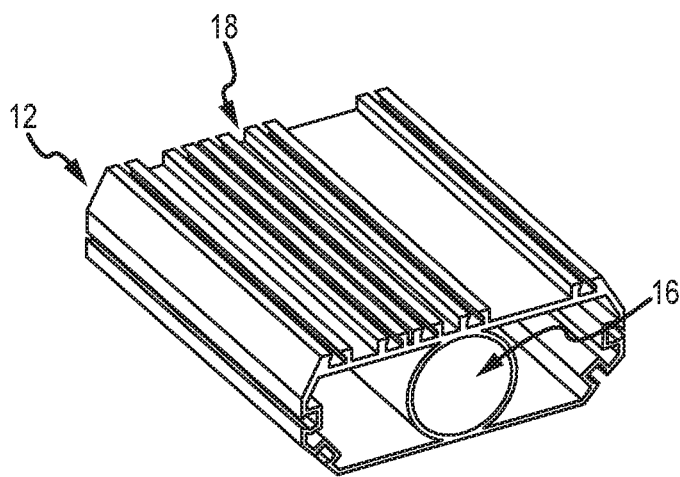

FIG. 2 is a perspective view of a component of a pressure washer according to one embodiment of the present disclosure.

Figure 3:
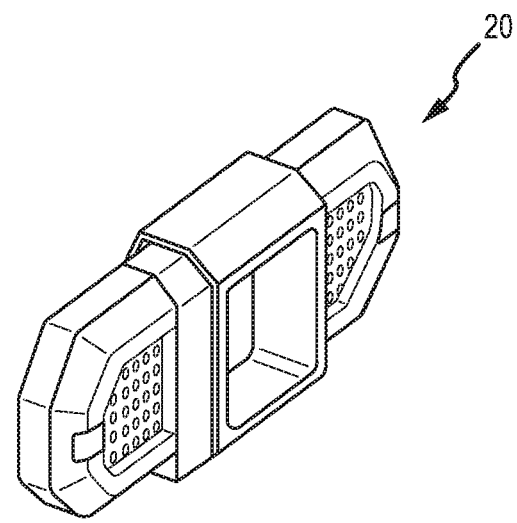

FIG. 3 is a perspective view of components of a pressure washer according to one embodiment of the present disclosure.

Figure 4:
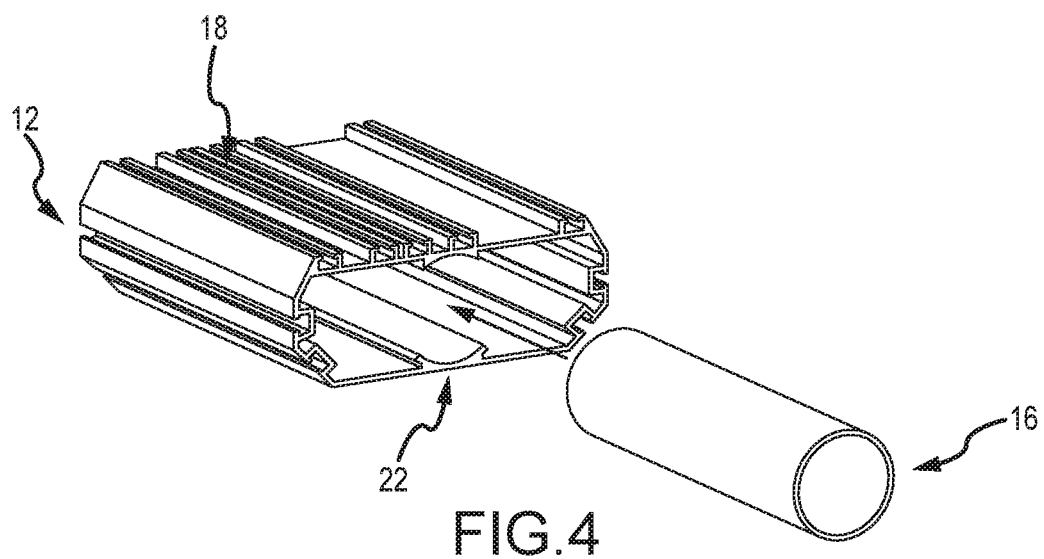

FIG. 4 is a perspective view of a component of a pressure washer according to one embodiment of the present disclosure.

Figure 5:
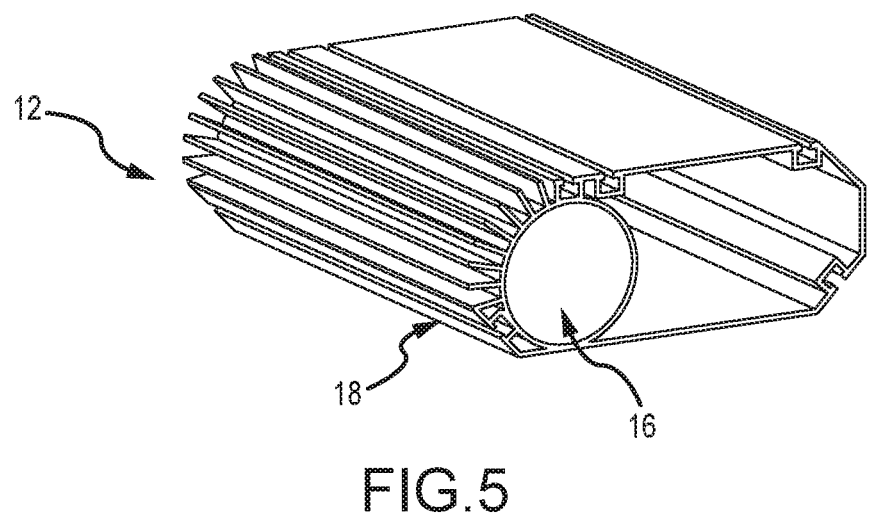

FIG. 5 is a perspective view of a component of a pressure washer according to one embodiment of the present disclosure.

Figure 6:
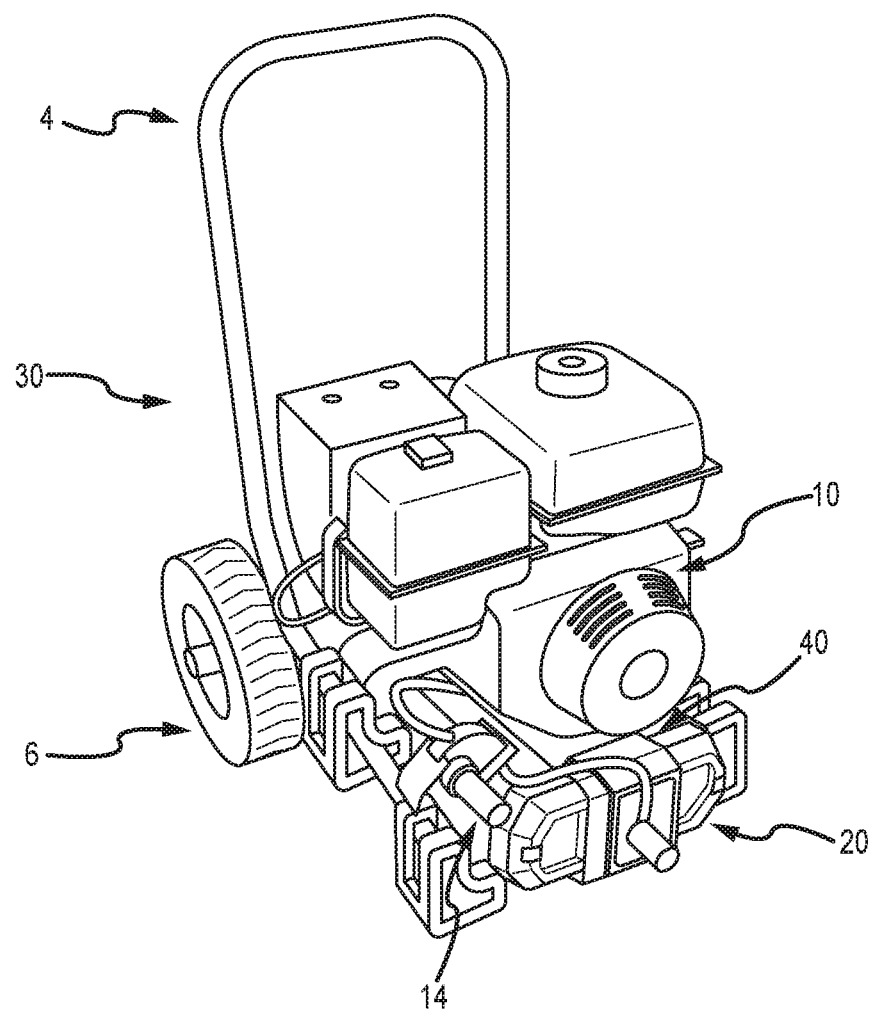

FIG. 6 is a perspective view of a pressure washer according to one embodiment of the present disclosure.

Figure 7:
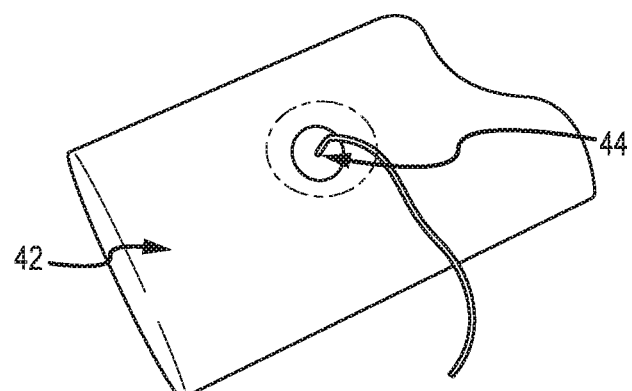

FIG. 7 is a perspective view of a component of a pressure washer according to one embodiment of the present disclosure.

Figure 8:
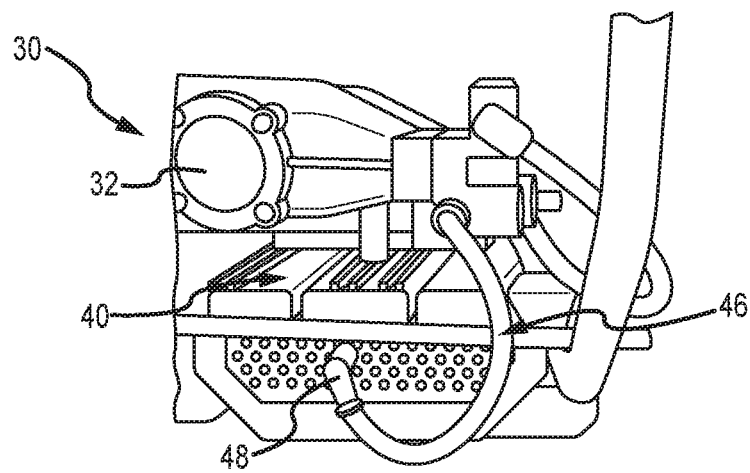

FIG. 8 is a detailed perspective view of a component of a pressure washer according to one embodiment of the present disclosure.

Figure 9:
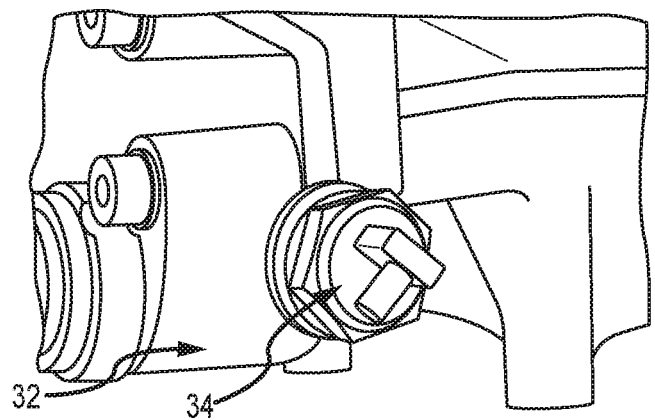

FIG. 9 is a detailed perspective view of a component of a pressure washer according to one embodiment of the present disclosure.

Figure 10:
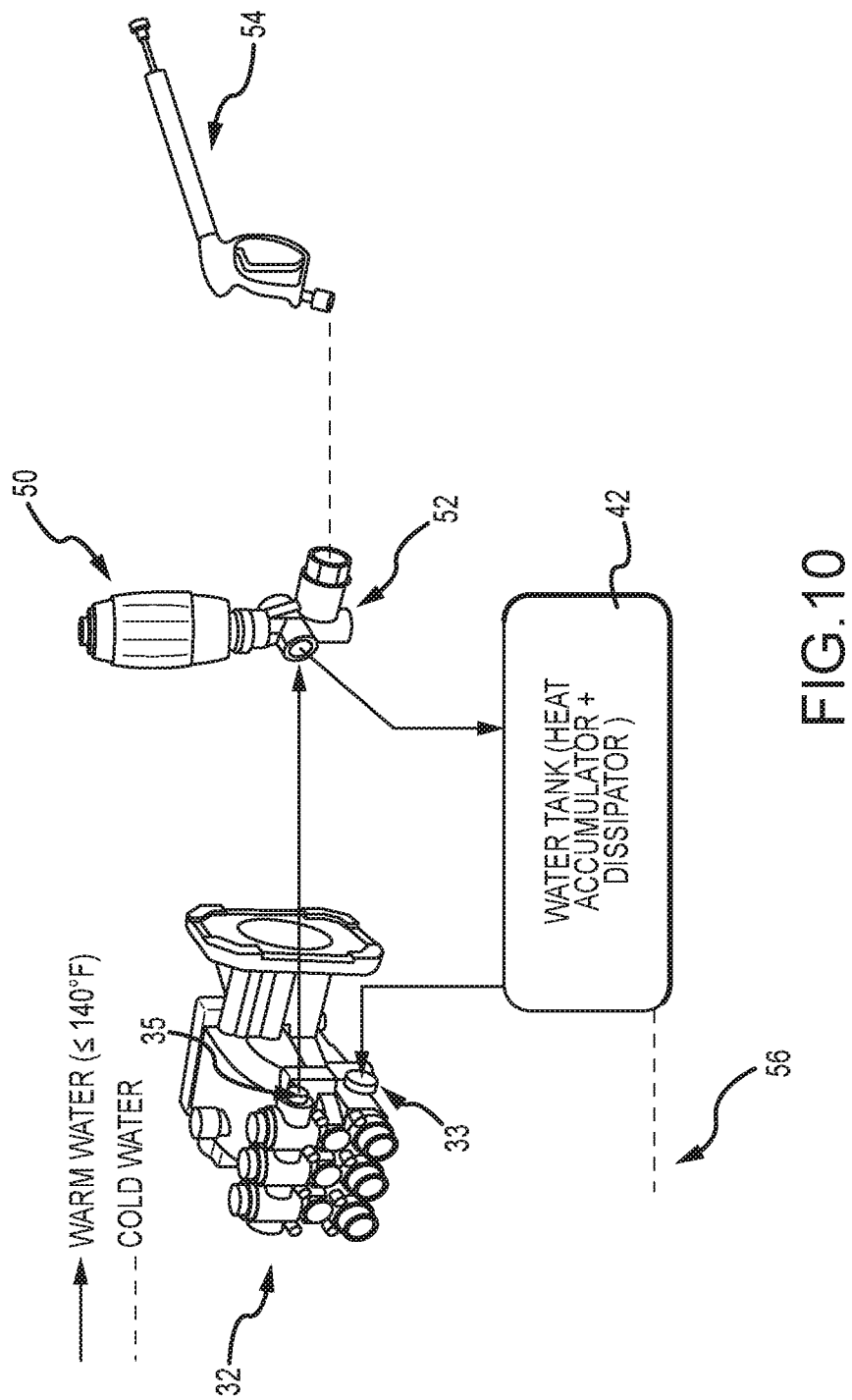

FIG. 10 is a schematic view of pressure washing components according to one embodiment of the present disclosure.

Figure 11:
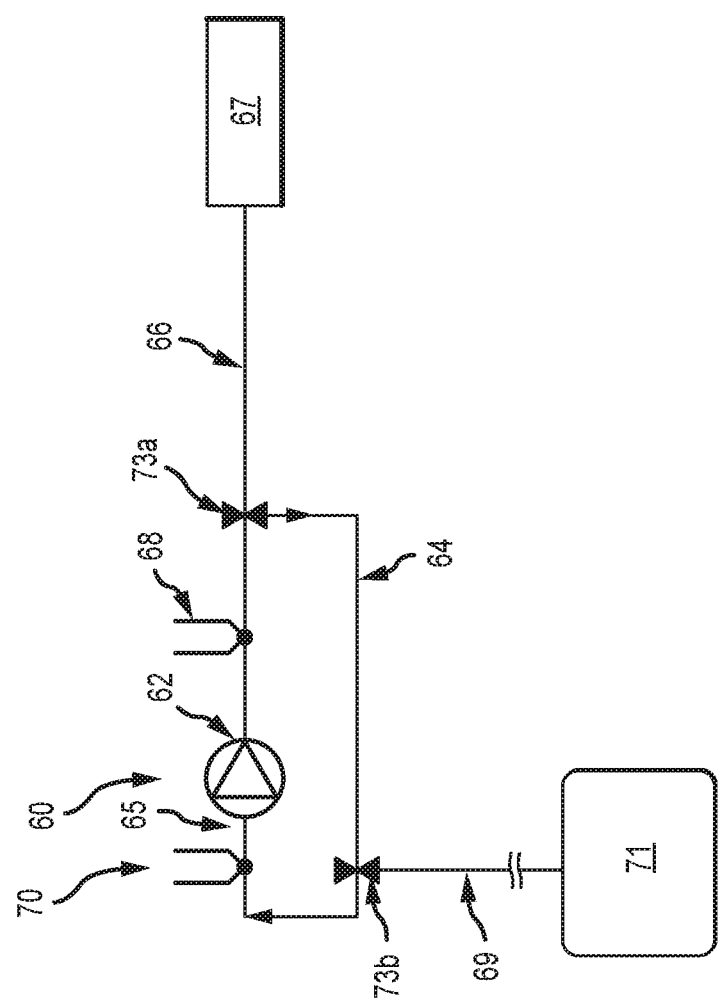

FIG. 11 is a schematic view of pressure washing components according to one embodiment of the present disclosure.

Figure 12:
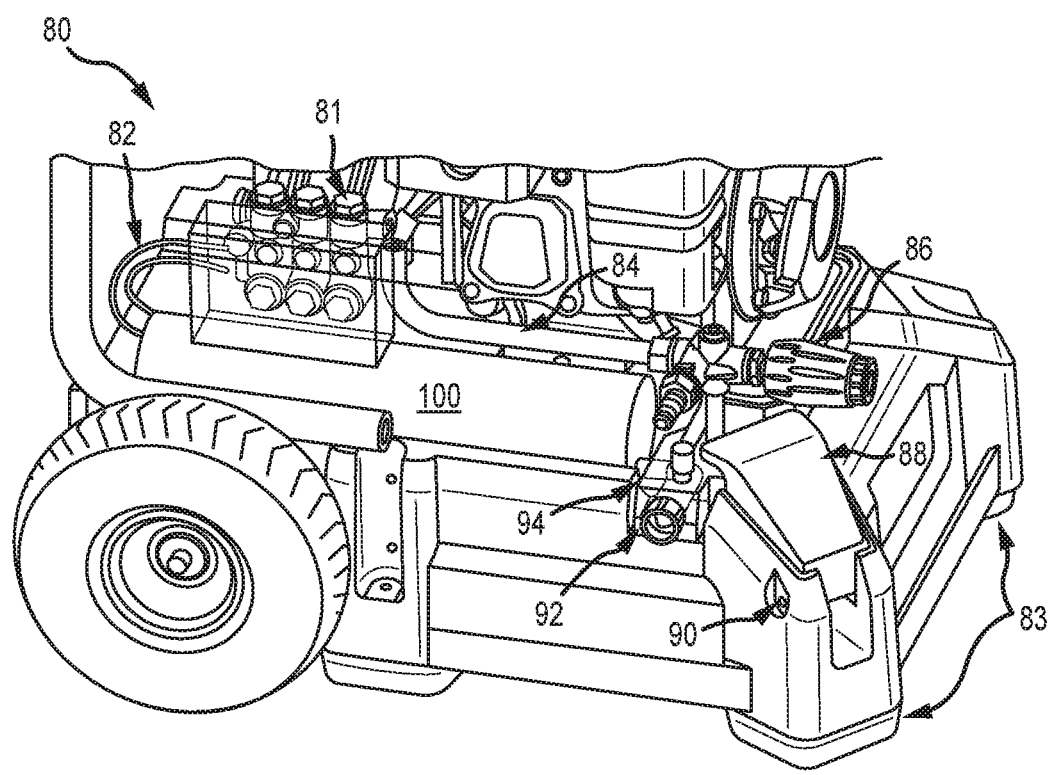

FIG. 12 is a perspective view of a pressure washer according to one embodiment of the present disclosure.

Figure 13:
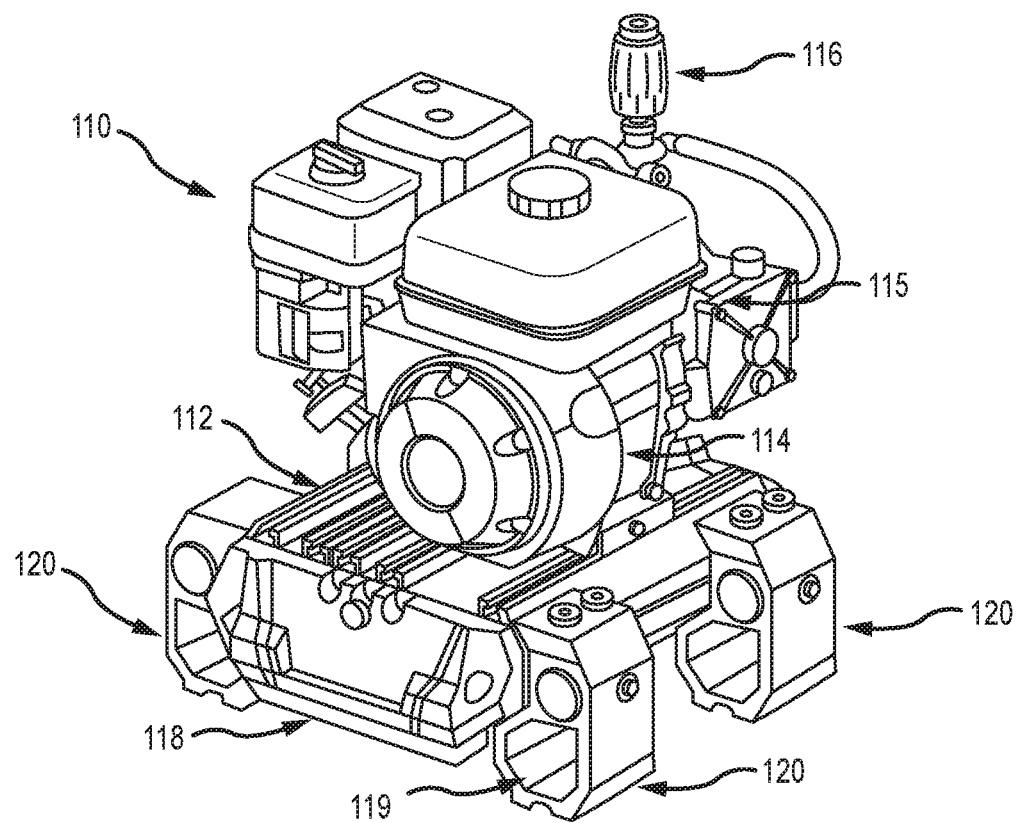

FIG. 13 is a perspective view of a pressure washer according to one embodiment of the present disclosure.

Figure 14:
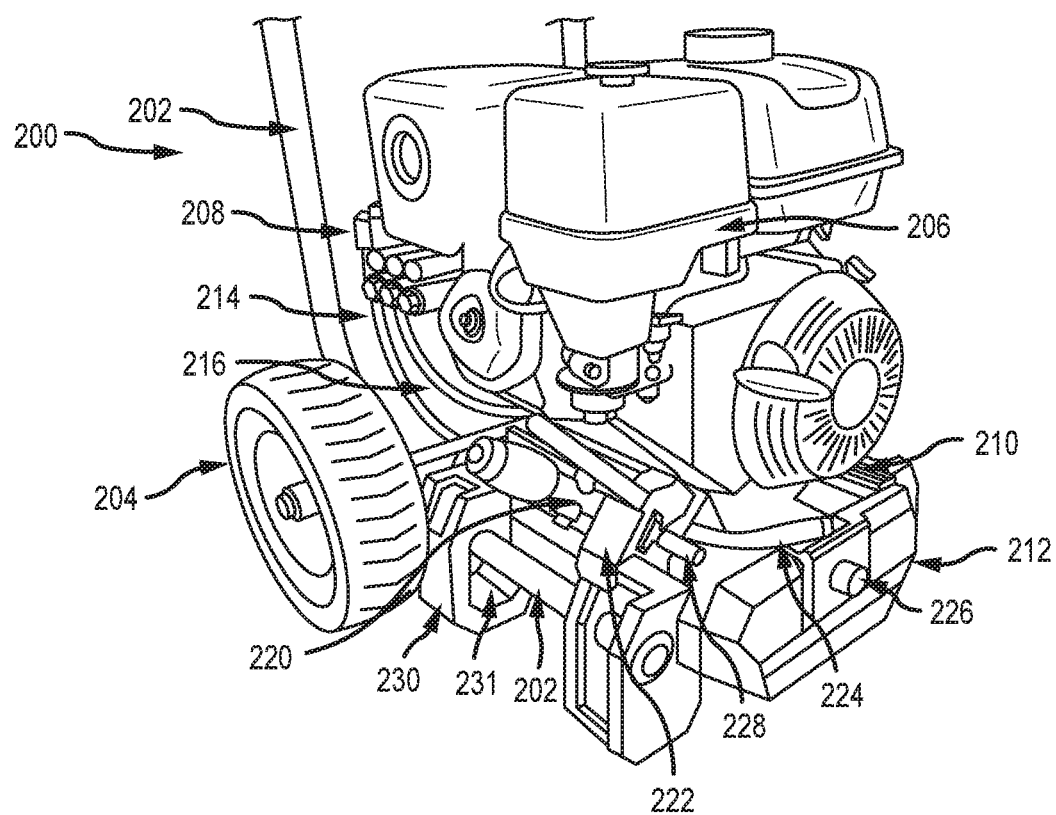

FIG. 14 is a perspective view of a pressure washer according to one embodiment of the present disclosure.

Figure 15:
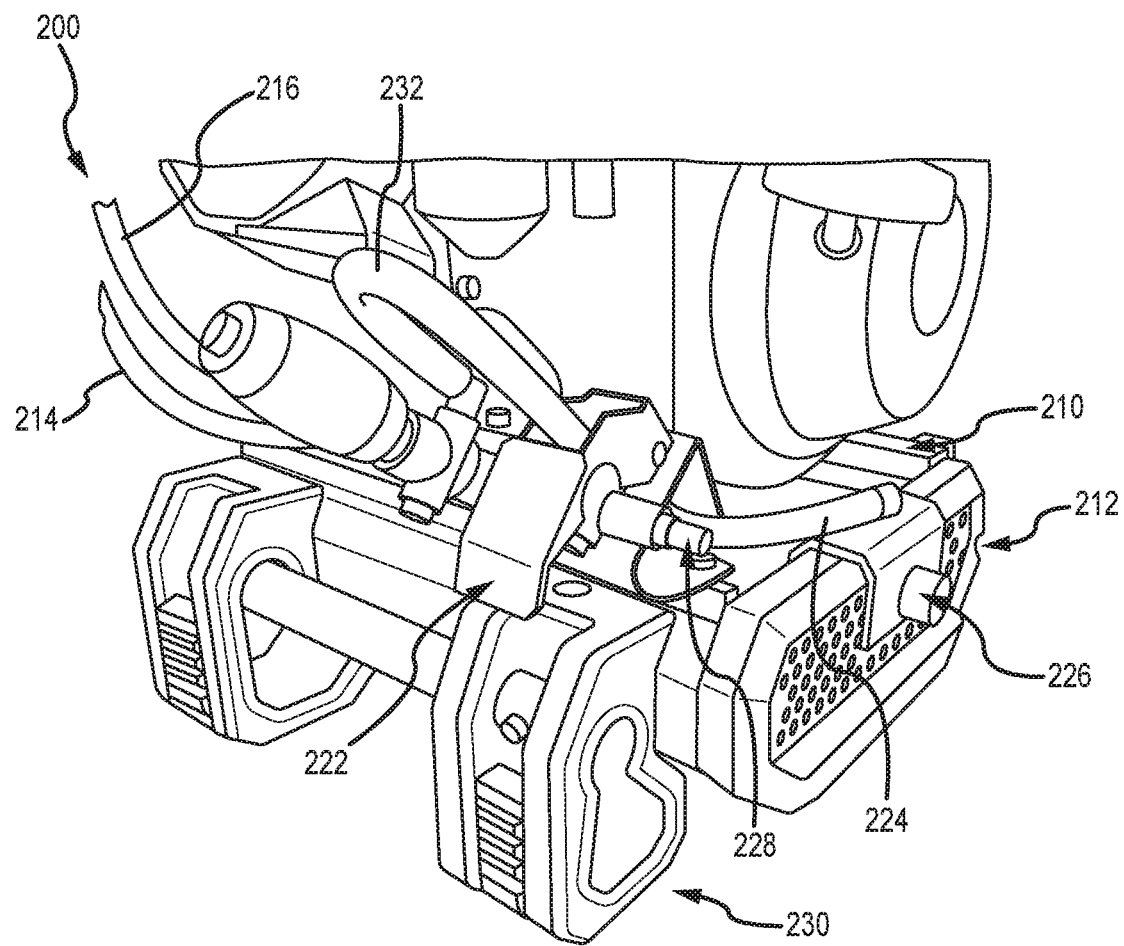

FIG. 15 is a perspective view of a pressure washer according to one embodiment of the present disclosure.

Figure 16:
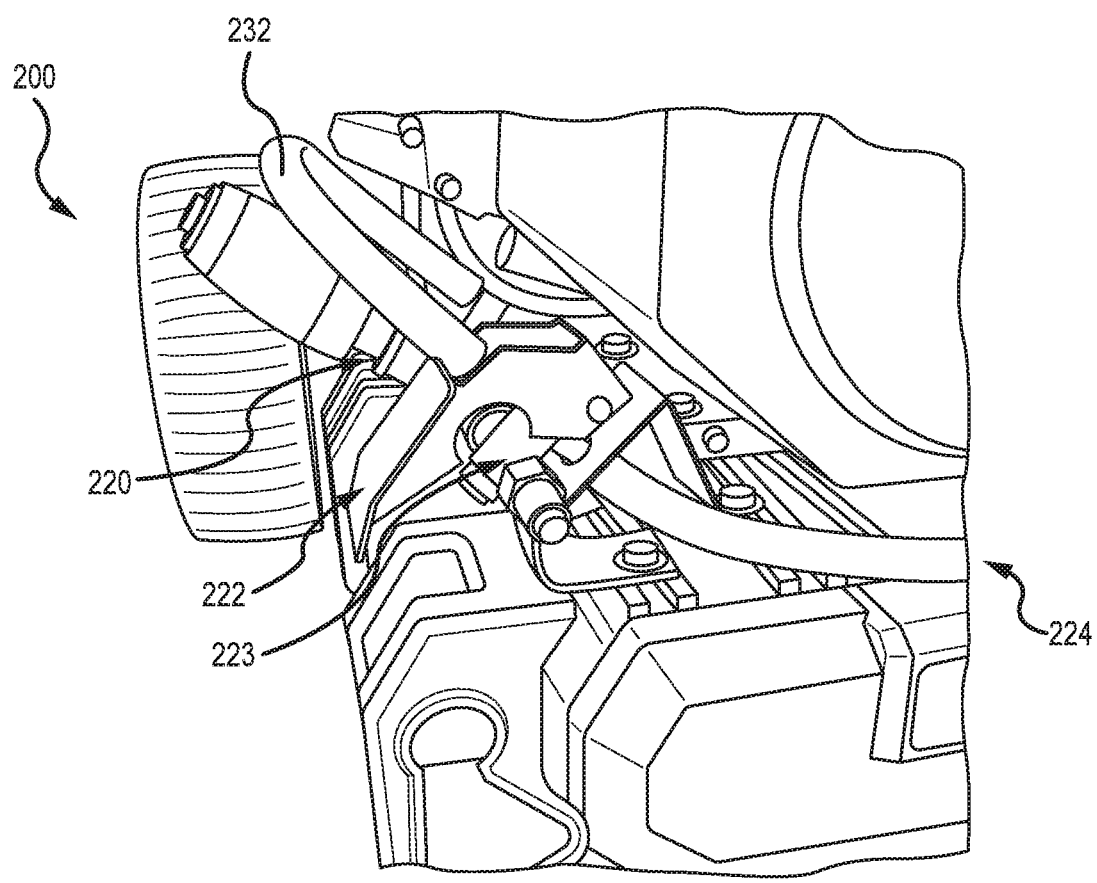

FIG. 16 is a perspective view of a portion of a pressure washer according to one embodiment of the present disclosure.

Figure 17:
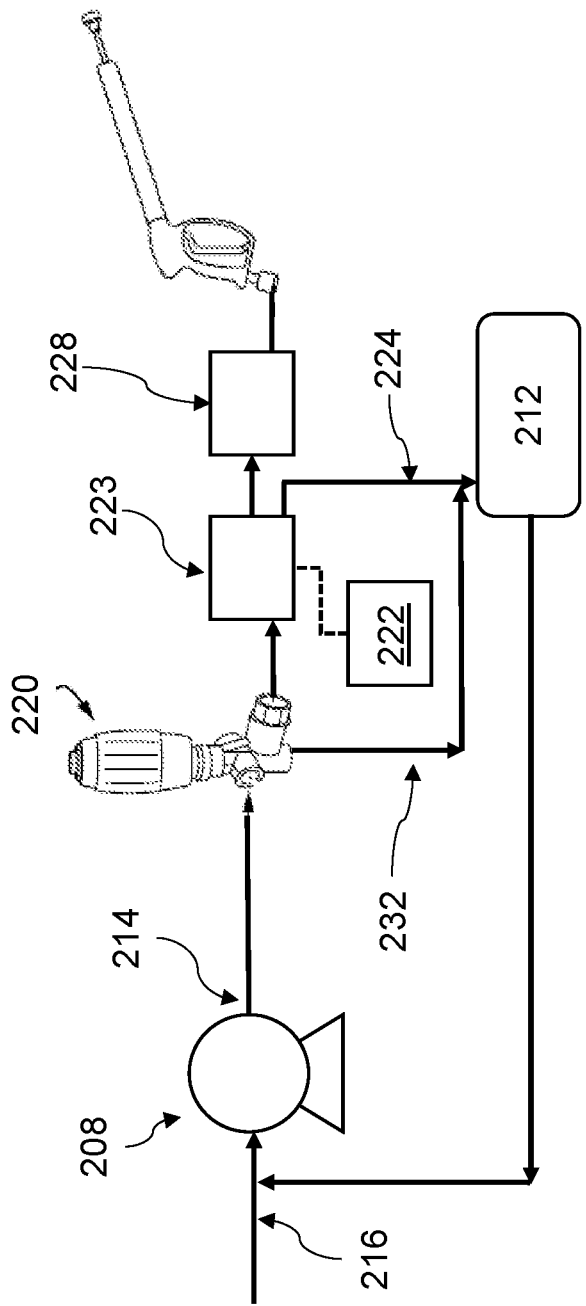

FIG. 17 is a schematic of a fluid flow path and related components according to one embodiment of the present disclosure.

DETAILED DESCRIPTION

FIG. 1 is a perspective view of a pressure washer 2 according to one embodiment of the present disclosure. As shown, the pressure washer 2 comprises a portable pressure washing device having a handle 4 and a plurality of wheels 6. The device 2 comprises a positive displacement pump 8 powered by an engine 10 to pressurize and selectively expel a fluid from a high-pressure outlet 14. Although not shown in FIG. 1, one or more hoses or other devices may be connected to the device 2 to provide the device with a fluid source, and to convey pressurized fluid from the device for use in pressure washing applications, for example. The handle 4 preferably comprises a metal frame member, wherein an upper portion of the metal frame member serves as a handle or user interface and a lower portion of the handle can extend below the pump 8 and engine 10 to provide structural support for the device.

The lower frame member 12 comprises an extruded member which, in preferred embodiments, comprises a water tank or similar fluid storage feature. The lower frame member 12 comprises a structural support for the device, including a mounting surface for the pump 8 and engine 10. The lower frame member 12 further comprises a fluid storage tank 16 (see FIG. 2) within which fluid can be stored and/or cooled and it may include an end cap 20 (shown in FIG. 3).

FIG. 2 is a perspective view of a lower frame member 12 with incorporated storage tank 16. As shown, the frame member 12 comprises an extruded metal frame member with a plurality of fins 18 extending therefrom. The fins 18 are provided to enhance heat transfer from fluid housed in the storage tank 16 to the walls of the lower frame member 12. In certain embodiments, the fins 18 also provide enhanced structural support to the frame member 12. As shown in FIG. 2, the fins 18 also can comprise slots or channels that are operable to slidably receive fasteners and provide a mounting feature for an engine, motor, or pump. In various embodiments, extensions of the lower frame member 12 serve the dual purpose of increasing surface area to promote heat transfer and provide a structural mounting support for additional components. The fins can be any size or shape or number that is useful in dissipating heat.

In preferred embodiments, the frame member 12 comprises an extruded aluminum member. It will be recognized, however, that frame members of the present disclosure are not limited to any particular metal or material. A tank 16 is provided at least partially housed within the frame member 12. The tank 16 comprises a pass-through fluid storage volume and is not necessarily limited to a conventional tank shape. For example, the tank 16 is contemplated as comprising a serpentine or other arcuate member extending within the lower frame member 12. The tank 16 thus need not comprise a standard elongate cylindrical or semi-cylindrical component. In preferred embodiments, the tank 16 comprises a structure with enhanced surface area, such as circuitous or wound tubing extending within the lower frame member 12.

Tanks of the present disclosure are contemplated as comprising storage tanks for receiving and/or storing a fluid. For example, in some embodiments, the tank 16 is provided in-line with and comprises a portion of a bypass line or circuit. The tank increases the cooling and heat transfer capabilities of the bypass mode of a device to avoid dumping or wasting fluid that has been excessively heated during a bypass operation. Embodiments of the present disclosure provide a tank 16 into which bypass fluid is directed and allowed to cool prior to returning to a pump. The tank 16 is preferably provided in contact with or in close proximity with an associated frame member 12 to encourage heat transfer from a fluid to the tank 16, frame member 12 and surrounding environment.

The tank 16 of FIG. 2 comprises a substantially cylindrical tank that is preferably provided in contact with the frame member 12 to enable conductive heat transfer, at least between the tank 16 and some portions of the frame member 12. A plurality of cooling fins 18 are provided on the tank and extending outwardly therefrom to further improve heat transfer and cooling of fluid housed within the tank.

FIG. 3 is a perspective view of end caps 20 according to embodiments of the present disclosure. The end caps 20 are provided to protect the device 2, and in certain embodiments comprise a storage volume for fluids, such as cleaning agents and solvents that may selectively be used in pressure washing operations. In certain embodiments, the end caps 20 comprise seals for the tank 16 and/or lower frame member 12. The end caps 20 may be selectively removed, in some embodiments, to access the tank 16 and/or provide a means for emptying the tank 16.

FIG. 4 is a perspective view of a frame member 12 according to one embodiment of the present disclosure. The frame member 12 comprises a fluid storage tank 16 provided within the frame, such that the fluid storage tank 16 is in contact with at least a portion of the frame member 12. The frame member 12 comprises at least one cradle member 22 for receiving and securing the fluid storage tank 16. In the embodiment of FIG. 4, the fluid storage tank 16 is generally provided in a central portion of the tank. The tank 16 of FIG. 4 comprises a component that is formed separately from the frame member 12 and which may be inserted into the frame member 12. The tank 16 of FIG. 4 may be inserted, welded, bolted, screwed, adhered, and/or press-fit into the frame member. In preferred embodiments, at least a portion of the tank 16 is in direct contact with the frame member 16 to promote conductive heat transfer between components and a fluid provided within the tank.

FIG. 5 is a perspective view of a frame member 12 according to another embodiment of the present disclosure. As shown, a frame member 12 is provided with a fluid storage tank 16 that is integrated into the frame member 12. Additionally, FIG. 5 depicts an embodiment wherein the fluid storage 16 is provided in a corner or bend of the frame member 12, which allows the tank 16 to be in contact with a greater amount of surface area of the frame member 12 than the tank of FIG. 4. An outer surface of the frame member 12 may be provided with cooling fins 18.

FIGS. 4-5 show alternative embodiments wherein a fluid storage tank 16 is provided in a central location with respect to the frame member 12 and a corner portion of the frame member, respectively. It will be recognized that a tank may be provided in either, both or other locations simultaneously, regardless of the connection method of the tank to the frame and/or whether or not the tank is a separate component or is integrated and co-formed with the frame member 12. It is also contemplated that a plurality of tanks may be provided within the frame member. For example, tanks may be provided in the corner(s) of the frame member and/or in the central portion of the frame member, or mounted on top, below or aside the frame. It is further contemplated that a tank is provided that extends along multiple areas of the frame member. For example, a serpentine-style tank is contemplated that extends throughout the internal volume of the frame member 12. In further embodiments, it is contemplated that the frame member 12 comprises a substantially enclosed volume and wherein the frame member 12 itself comprises the entire tank. Also and again, the tank and/or portions thereof can be the tank.

FIGS. 6-9 are perspective views of a pressure washer 30 and various components therefor according to embodiments of the present disclosure. FIG. 6 is a perspective view of an assembled pressure washer 30. The pressure washer 30 comprises various known components including, for example, an engine 10 and positive displacement pump (32 in FIG. 8, for example). A lower portion of the device 30 comprises a lower frame member 40. The lower frame member 40 preferably comprises a support structure or skid member that is operable to provide support to additional components of the pressure washer 30. The lower frame member 40 is also contemplated as comprising feet having a support and interface for lifting and moving the pressure washer with additional devices (e.g. a forklift). In preferred embodiments, the lower frame member 40 comprises an extruded aluminum member having strength, durability, and corrosion-resistance and a relatively low weight. The lower frame member 40 of the present disclosure is contemplated as comprising an at least a partially hollow interior portion, which may be provided as a storage volume for fluid, or may comprise and house a fluid storage vessel as shown and described herein.

As shown, the pressure washer 30 comprises a portable pressure washing device having a handle 4 and a plurality of wheels 6. The device 30 comprises a positive displacement pump powered by an engine 10 to pressurize and selectively expel a fluid from a high-pressure outlet 14. Although not shown in FIG. 6, one or more hoses may be connected to the device 30 to provide the device with a fluid source, and to convey pressurized fluid from the device for use in pressure washing applications, for example. The handle 4 preferably comprises a metal frame member, wherein an upper portion of the metal frame member serves as a handle or user interface and a lower portion of the handle can extend below the pump and engine 10 to provide structural support for the device.

The lower frame member 40 comprises an extruded member which, in preferred embodiments, comprises a water tank. The lower frame member 40 comprises a structural support for the device, including a mounting surface for the pump and engine 10. The lower frame member 40 further comprises a fluid storage tank within which fluid can be stored and/or cooled.

FIG. 7 is a perspective view of a fluid storage vessel according to one embodiment of the present disclosure. The fluid storage vessel of FIG. 7 is provided in the form of a fluid storage tank 42 that is operable to be disposed within an interior volume of the lower frame member 40. The fluid storage tank 42 comprises a metal tank with a generally cylindrical shape. The fluid storage tank 42 is operable to receive a fluid from the pressure washer at least when the pressure washer is operating in a bypass mode. The fluid storage tank 42 is provided in fluid communication with a bypass portion of the pressure washer. The tank 42 comprises an inlet and an outlet for bypass fluid and generally increases a total volume of a bypass portion of a pressure washer. The additional volume and increased surface area associated with the tank and cooling fins provides enhanced heat transfer from the fluid that is known to warm to potentially unacceptable levels during a bypass operation.

As shown in FIG. 7, a thermocouple 44 is provided and extends into an interior volume of the fluid storage tank 42. The thermocouple is operable to determine a temperature of a fluid within the storage tank 42. In various embodiments, the thermocouple 44 is operable to measure a temperature of at least one of a fluid within the thank 42 and the tank itself. The thermocouple is further operable to convey at least one of a plurality of signals. For example, in some embodiments, the thermocouple is operable to constantly monitor a temperature of the tank 42 or associated fluid and to send a signal to power-down the engine or motor of the pressure washer if and when a maximum allowable temperature is exceeded.

The thermocouple 44 is contemplated as extending into an interior volume of the fluid storage tank 22 and being provided in contact with a fluid housed within the tank. The thermocouple may alternatively be provided in contact with a sidewall of the fluid storage tank 42. In further embodiments, a plurality of thermocouples are provided in contact with a fluid and/or the body of the fluid storage tank 42. Thermocouples are contemplated as one particular device that may be used to determine a temperature of a fluid and/or a fluid storage tank.

In alternative embodiments, if the determined temperature is sufficiently low (e.g., below 130° F.), the system may be prompted to return the fluid to the pump of the pressure washer. The thermocouple(s) may be in electrical signal communication with a remainder of the device to regulate fluid flow to and from the fluid storage tank 42. In further embodiments, other temperature-sensing devices are contemplated. Such devices include, but are not limited to, optical temperature sensors, thermistors, and other such devices known in the art.

Pressure washing devices of the present disclosure are contemplated as comprising a thermocouple or similar device that is operable to detect a temperature of a component of the device and/or a fluid within the device, and to send a shut-off command to the engine or motor. For example, a pressure washer of the present disclosure is contemplated as comprising a thermocouple in contact with at least a portion of a bypass circuit, and wherein the thermocouple is operable to provide a signal to power-down the engine or motor if and when a detected temperature exceeds a predetermined value. Bypass circuits of such embodiments are contemplated as comprising a tank feature as shown and described herein.

FIG. 8 is a detailed side view of the pressure washer device 30 according to the embodiment of FIG. 6. As shown, the pressure washer 30 comprises a lower frame member 40. The bypass pump inlet is connected to the lower frame member 40 by a conduit 46. A coupling 48 is provided to connect the pump inlet and the conduit 46 to the lower frame member 40 and/or the storage tank(s) provided within the lower frame member 40.

FIG. 9 is a view of a thermal valve of the pressure washer 30. The pressure washer 30 comprises a thermal switch that is operable to open a valve 34 or otherwise activate a fluid flow path to transfer fluid away from a bypass operation or allow fluid flow when the fluid temperature has exceeded a predetermined value. The Applicant has found that fluid provided in a by-pass mode of the pump (wherein the fluid is recirculated and not expelled) can be subjected to excessive heating. For example, it has been found that under certain conditions, fluid circulating in a pressure washer that is in a bypass mode can be heated by moving and working components of the pump (for example) to temperatures above 115° F. in about ten minutes and temperatures above 131° F. after approximately fifteen minutes when operating in a conventional bypass mode. Embodiments of the present disclosure provide for cooling a fluid subjected to the bypass operation. Water or fluid diverted through the thermal valve 34 may either be expelled from the system in the form of waste water or may be diverted to a bypass circuit or other component of the pump via a conduit (not shown in FIG. 9). In some embodiments, a thermal switch is also provided to shut-down the engine or pump if a fluid in at least one region of the device exceeds a predetermined temperature. It is also contemplated that pressure washers of the present disclosure may be provided with a timer mechanism, wherein the timer mechanism is activated upon activation of a bypass mode and wherein the timer is operable to turn off an engine or motor after a predetermined amount of time (e.g. twenty minutes). Such timer mechanisms may be provided in combination with, or in lieu of, temperature sensing devices and related controls as shown and described herein.

In preferred embodiments, pressure washers are provided with a bypass mode or bypass circuit. The bypass circuit includes a tank or similar storage vessel in-line with bypass lines, and the tank increases a total volume of the bypass section thereby increasing the amount of fluid travelling in the bypass section and providing enhanced cooling characteristics (at least as compared to bypass fluid travelling directly back to a pump via a line or hose).

In alternative embodiments, fluid is automatically conveyed from a pump to a fluid storage tank if and when the fluid exceeds a maximum allowable temperature. Such a maximum allowable temperature may vary based on certain conditions. In some embodiments, however, it is contemplated that this maximum allowable temperature is any temperature equal to or greater than approximately 131° F.

In some embodiments, a thermocouple is provided in connection with a bypass portion of a pump and is operable to detect a temperature of the fluid in the bypass section of the pump and to convey a signal to a controller or other similar device known in the art that can then divert fluid to the fluid storage tank 42. It is contemplated that pressure washers of the present disclosure are provided with timers and associated logic and that the system(s) can divert fluid from a bypass section of a pump to a fluid storage tank after the bypass mode has been active for a predetermined amount of time (e.g. 15 minutes).

Fluid storage tanks 42 of the present disclosure are contemplated as comprising at least one temperature sensor to determine and evaluate the temperature of a fluid in the fluid storage tank. That sensor, which may be in the form of a thermocouple, is operable to provide a signal to the controller system to return a fluid housed within the fluid storage tank to the pump once the temperature of the fluid has cooled below a predetermined temperature.

As shown in FIG. 9, the pump 32 of the pressure washer comprises a fluid outlet associated with the pump to allow for egress of fluid. In some embodiments, it is contemplated that the device comprises a valve 34 with a thermal switch or similar pump-protection device in connection with the low-pressure section of the pump. The thermal switch is operable to enable egress of heated fluid from the pump. The pump protector is contemplated as providing a means to simply expel heated water from the system in the form of waste water.

FIG. 10 is a schematic of a pump 32 comprising a bypass feature, a fluid storage tank 42, and related structure according to one embodiment of the present disclosure. As shown, the pump 32 comprises a high-pressure section with a fluid outlet 35 and a fluid inlet 33. The fluid outlet 35 is interconnected, directly, indirectly or otherwise, to a bypass valve 52. As shown in FIG. 10, the bypass valve 52 comprises an unloader valve 50 for selectively lowering pressure within the pump 32 and associated bypass line, etc. The unloader valve 50 is useful, for example, to relieve a pump of pressure when the internal pressure is too high to enable manual starting of the pump. A spray gun 54 or similar dispensing device can also be provided. The spray gun 54 is operable to dispense fluid and perform pressure washing operations, as will be recognized by one of ordinary skill of the art. When the trigger of the spray gun 54 is provided in a closed position, fluid that would normally flow through the gun 54 is recirculated through a path that comprises a fluid storage tank 42 and the pump 32. The fluid storage tank 42 comprises a water inlet 56 for the introduction of fresh or clean water into the system.

In various embodiments, the fluid storage tank 42 is provided in thermal communication with a lower frame member and/or cooling fins as shown and described herein. In some embodiments, an enclosed fluid tank is provided with a ventilation cap. In further embodiments, it is contemplated that the fluid storage tank comprises cooling fins extending directly from the tank, regardless of whether or not the tank is provided within a lower frame member. In some embodiments, a fluid storage tank is provided that comprises air cooling including, for example, a tank that is provided with forced air cooling. In yet another embodiment, it is contemplated that fluid is directed or routed through at least one of a tubular frame and a handle of a pressure washer device to cool the fluid. It is also contemplated that lower frame members of the present disclosure comprise fins on an interior portion of the member. Fins of the present disclosure generally increase a surface to promote heat transfer. Although such fins may be referred to herein as "cooling fins," it will be recognized that the fins comprise heating or cooling fins depending on environmental conditions, and generally comprise heat-transfer fins.

FIG. 11 is a perspective view of features of a pressure washer according to one embodiment of the present disclosure. As shown, the device comprises a pump 60 having a high-pressure outlet 62. The outlet 62 is interconnected to a conduit 64 that comprises a bypass line that is operable to recirculate fluid from a high-pressure outlet 62 of the pump 60 to a low-pressure inlet 65. A primary pump outlet line 66 is provided to convey fluid to a spray gun 67 (for example). However, when the spray gun or similar feature is not in operation, fluid is recirculated through the bypass line 64. A fresh or clean fluid inlet 69 is provided for selectively providing the system with clean fluid(s) from a source 71 such as a municipal water supply, a tank, or other source of fluid. One or more valves 73a, 73b are provided to selectively control fluid flow in the system.

In the embodiment of FIG. 11, temperature sensing means are provided in association with at least the high-pressure outlet 62 and the low-pressure inlet 65. Specifically, first 68 and second 70 thermocouples are provided in communication with a fluid flow of the high-pressure outlet 62 and the low-pressure inlet 65, respectively. Data provided by the thermocouples 68, 70 can be used to indicate to a user and/or to (typically via electrical signals) a control circuit of the pressure washing device that a fluid is either above or below an acceptable temperature. For example, the first thermocouple 68 is operable to detect whether the fluid temperature exiting the high-pressure outlet is unacceptably high and is operable to convey that information to a user and/or to the device itself via an electrical signal. Based on the occurrence of such a temperature condition, the device is operable to perform at least one of several functions. For instance, the device is operable to continue to recirculate fluid in the bypass mode until pressure washing activities resume, or until a thermal switch sends a signal to power-down the engine or motor. The device is also capable of alerting a user to power-down the machine and allow the fluid and device components to cool. Temperature information obtained by the second thermocouple 70 associated with the low-pressure inlet 65 is also operable to convey to a user and/or to the device whether water entering the low-pressure side of the pump is above or below a desired temperature.

Applicant has determined that temperature readings provided by the first and second thermocouples 68, 70, as shown and described herein, can reach levels of between approximately 110° and 125° F. within approximately fifteen minutes of pump bypass mode operation. Pump protectors of the present disclosure, which preferably comprise a valve to divert fluid to a tank and/or expel hot water from the device have been shown to reduce the temperature of fluid and device components from between approximately 110° and 125° F. to between approximately 60° F. and approximately 90° F. within approximately one minute of activating the pump protector device.

In various embodiments, pressure washing devices are provided as hot-water pressure washing machines. In such embodiments, it is contemplated that fluid is stored within a tank, and the tank is subjected to heating. Heat sources of such embodiments include, for example, exhausted heat from the engine of the device. It is contemplated that pressure washing devices of the present disclosure may be operated in a cold-water mode wherein cold or unheated fluid is expelled while fluid in the tank and/or a remainder of the bypass circuit is being heated. A switch is contemplated as being provided, and it is operable to reconnect a heated volume of fluid to the pump. Thus, in various embodiments, the bypass circuit and tank is selectively isolated or cut-off from a remainder of the system to provide a fixed volume of fluid to be heated.

FIG. 12 is a perspective view of a pressure washer 80 according to one embodiment of the present disclosure. As shown, the pressure washer 80 comprises a pump 81 with a low-pressure inlet 82 and a high-pressure outlet 84. The high-pressure outlet is connected to an unloader valve 86. A foot pedal 88 is provided, wherein the foot pedal 88 comprises a user-interface to allow an operator to quickly and easily selectively activate the unloader valve 86. The pedal 88 is preferably secured to a remainder of the device by a fastener 90. The fastener 90 preferably comprises a pin or a screw to rotatably connect the pedal to the device 80 and allow for rotation of at least a portion of the pedal 90. In various embodiments, an engine is provided in combination with the pressure washer 80 and comprises a manual-start engine device, typically including a pull-cord (for example). In operation, a user may start the engine by stepping on or otherwise providing a force to the foot pedal 88 and thereby open a valve between the high-pressure side of the pump and the low pressure-side of the pump. The opening of this valve prevents the pump from building pressure and experiencing a load that would make it difficult or impossible to pull-start the engine and pump.

A lower pressure inlet 92 is provided as an injection point for clean fluid into the manifold 94 of the device 80 and a water tank 100 is also provided. The water tank 100 includes an in-line component in a fluid bypass section of the device 80. In various embodiments, the tank 100 comprises a pass-through component that allows fluid to be diverted through the tank 100, such as when the device is operating in a bypass mode. The increased volume of the tank 100 (relative to a fluid-flow line) provides for increased heat transfer from a fluid provided within the bypass section of the pump (including the tank 100). In preferred embodiments, fluid is constantly flowing through the tank 100 when the bypass mode of the device is active. In alternative embodiments, it is contemplated that fluid is transferred to the tank 100 and allowed to remain in the tank 100 for a predetermined amount of time and/or until the fluid has been cooled to a predetermined temperature. Upon the occurrence of such a condition, fluid is reintroduced into the pump.

In various embodiments, including the embodiments of FIGS. 12 and 15, the wheels of the device are provided above ground-level when at least some of the feet 83 (230 in FIG. 15) are provided in contact with the ground or floor surface. The wheels are rendered operable by tilting the device such that the feet are elevated and the device is then operable to be rolled along a surface.

FIG. 13 is a perspective view of a pressure washer 110 according to one embodiment of the present disclosure. As shown, the pressure washer 110 comprises an engine 114 that is operable to drive a pump 115. The pump 115 is in fluid communication with an unloader valve 116. The engine 114 and pump 115 are provided on and supported by a lower frame member 112. In various embodiments, the lower frame member 112 comprises an extruded frame member that provides structural support to the engine 114 and a pump 115. In preferred embodiments, the lower frame member 112 comprises an internal volume. At least a portion of the internal volume of the lower frame member 112 comprises a storage container or volume for receiving and cooling a fluid during a bypass operation. The lower frame member 112 is provided with a cover 118 which is preferably selectively removable to allow for access to an internal volume of the lower frame member 112. The lower frame member 112 comprises a plurality of feet 120, which preferably comprise rubber feet that support the device and provide vibration damping. It is further contemplated that the feet 120 comprise mounting and support members for a frame member to provide for a mobile pressure washer. In the depicted embodiment, the feet 120 comprise at least one aperture 119 that provide(s) a lift point or weight-bearing surface. The apertures 119 may comprise, for example, an interface for communicating with the tines of a forklift.

The lower frame member 112 is preferably in fluid communication with the pump 115. Specifically, it is contemplated that a bypass section of the pump is provided wherein fluid that is not expelled from a spray gun (for example) is recirculated in the device 110. The recirculation of the fluid comprises a fluid flow path that includes the internal volume of the frame member 112. In some embodiments, at least one tank is provided within the internal volume of the lower frame member 112.

FIGS. 14-16 are perspective views of a pressure washer 200 according to one embodiment of the present disclosure. As shown, the pressure washer 200 comprises a frame 202 and wheels 204. The frame 202 and wheels 204 comprise optional members that may or may not be provided with pressure washing features as shown and described. The device further comprises a gas or diesel-powered engine 206 or other power source, which is operable to power a pump 208. The power source 206 and associated pump 208 are provided on a lower frame member 210 that preferably comprises an extruded metal component. The lower frame member 210 comprises a cap or cover 212.

A plurality of feet 230 are provided and are interconnected to the lower frame member 210. The feet 230 comprise support members for the lower frame member 210 and related components, and the feet 230 are also operable to receive and secure a frame member 202. The feet 230 comprise apertures 231 that are useful for lifting and transporting the device 200. The apertures 231 may receive the tines of a forklift, for example.

As further shown in FIGS. 14-17, the pressure washer comprises a fluid flow path including a bypass. Specifically, a high-pressure outlet 214 is shown as extending from the pump 208. A low-pressure inlet 216 is provided to supply a fluid to the pump. During operation, pressurized fluid is expelled from a high-pressure outlet 228 to which a hose and spray gun (for example) may be connected. The fluid flow path comprises an unloader valve 220 and a foot pedal 222. The foot pedal 222 is operable to control and open a valve 223 (FIG. 16) to selectively divert fluid and/or pressure to a low-pressure bypass line 224. The foot pedal 222 is operable to selectively relieve or divert pressure in the system in order to assist in manual-starting of the device, for example. The low-pressure bypass line 224 is in fluid communication with a tank 212 provided within the lower frame member 210. A fresh water inlet 226 (FIG. 15) is also provided to introduce additional, clean, and/or cold water to the system.

Fluid travelling in a bypass mode or circuit of the embodiment of FIGS. 14-17 travels from the pump 208 through a high-pressure line 214 to an unloader valve 220, through a first bypass line 232 which bypasses a high-pressure outlet 228 and conveys fluid to a second bypass line 224 which is effectively an extension of the first bypass line 232, and into a tank 212 provided within the lower frame member 210. After passing through the tank, fluid is returned to the pump 208 via a return conduit in the form of the low-pressure line 216. Although not shown in FIG. 14, the device is contemplated as comprising at least one thermal switch that is operable to shut-off the engine 206. For example, when a fluid in at least a portion of the bypass circuit exceeds a predetermined temperature, a thermocouple or thermal switch is operable to send a signal to power-down the engine. It is also contemplated that the pressure washer 200 comprises a thermal switch that is operable to dispel or eject overheated fluid. For example, in some embodiments, the pump 208 comprises a thermal switch and associated valve that opens an outlet for overheated water in the bypass circuit. The ejected or wasted fluid may be replenished by the fresh water inlet 226 as needed.

Various features of the present disclosure are shown and described with respect to one or more particular embodiments. It should be recognized, however, that devices and features shown and described herein are not limited to particular embodiment. Rather, features of the present disclosure may be interchanged and/or provided with any of the embodiments disclosed herein, even if not expressly contemplated or shown in a particular Figure.

Various features and embodiments of pressure washing devices are provided herein. It will be recognized, however, that various features are not necessarily specific to certain embodiments and may be provided on any one or more embodiments. The present disclosure and embodiments provided herein are not mutually exclusive and may be combined, substituted, and omitted. The scope of the invention(s) provided herein is thus not limited to any particular embodiment, drawing, or particular arrangement of features.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A pressure washing device comprising:
   a lower frame member with a handle extending therefrom;
   a fluid flow path comprising a pump, an unloader valve, a bypass conduit and a second valve comprising a bypass valve;
   the pump comprising an inlet operable to connect to a water supply;
   the pump comprising an outlet operable to connect to a spray gun;
   the bypass conduit connecting the second valve and the inlet of the pump;
   wherein in a first condition of use, fluid is capable of exiting the outlet of the pump, and in a second condition of use fluid is directed to the pump inlet via the bypass conduit;
   a foot pedal having a user-interface and wherein the foot pedal is operable to selectively open the second valve and wherein the foot pedal is operable to relieve or divert pressure in the fluid flow path by opening the second valve.

2. The pressure washing device of claim 1, wherein the lower frame member comprises an extruded metal frame member and a fluid storage tank provided therein.

3. The pressure washing device of claim 2, wherein the fluid storage tank comprises a portion of the bypass conduit.

4. The pressure washing device of claim 1, further comprising a thermocouple in communication with the bypass conduit.

5. The pressure washing device of claim 1, wherein the lower frame member comprises a plurality of rubber feet that support the device and provide vibration damping.

6. The pressure washing device of claim 1, further comprising a gas engine or an electric motor in communication with the pump.

7. A pressure washing device comprising:
   a fluid flow path comprising a pump with a high pressure outlet and a low pressure inlet, and wherein the fluid flow path comprises a first valve, a second valve, and a bypass line;
   a foot pedal provided in communication with the second valve and operable to selectively divert, at least one of fluid and pressure to the bypass line by opening the second valve;
   the low pressure inlet having a first end operable to connect to a water supply and a second end associated with the pump;
   the high pressure outlet having a first end operable to be associated with the pump and a second end operable to connect to a spray gun;
   the second valve comprising a bypass valve in fluid communication with the pump outlet;
   wherein the bypass line connects the second valve and the pump inlet;
   wherein in a first condition of use, fluid is capable of exiting the second end of the high pressure outlet, and in a second condition of use, fluid is not capable of exiting the second end of the high pressure outlet; and
   wherein in the second condition of use, fluid is capable of being directed from the bypass valve through the bypass line and into the pump inlet.

8. The pressure washing device of claim 7, wherein the bypass line comprises a heat exchanger that is operable to cool a fluid provided within the bypass line.

9. The pressure washing device of claim 7, wherein the device comprises an extruded metal frame member, and wherein the bypass line extends through the frame member.

10. The pressure washing device of claim 9, wherein at least one of the extruded metal frame member and the fluid storage tank comprises cooling fins.

11. The pressure washing device of claim 7, further comprising a thermocouple in communication with the bypass line.

12. The pressure washing device of claim 7, further comprising a gas engine or an electric motor in communication with the pump.

13. A pressure washing device comprising:
    a lower frame member and a handle extending therefrom;
    a pump supported on the lower frame member;
    a pump inlet operable to connect to a water supply and provide fluid to the pump;
    a pump outlet operable to expel fluid;
    a bypass valve in fluid communication with at least one of the pump and the pump outlet;
    a bypass circuit operable to recirculate a fluid from the pump outlet to the pump inlet; and
    wherein the bypass valve is actuated by a foot pedal provided on the lower frame member to selectively relieve a pressure within the pump to facilitate a starting operation of the device.

14. The pressure washing device of claim 13, wherein the bypass circuit comprises a heat exchanger that is operable to cool a fluid provided within the bypass circuit.

15. The pressure washing device of claim 13, wherein the lower frame member comprises an extruded metal frame member; and wherein a fluid storage tank is provided within the lower frame member.

16. The pressure washing device of claim 13, wherein the lower frame member comprises a plurality of feet extending therefrom, and wherein the feet comprise vibration dampening elements.

17. The pressure washing device of claim 16, wherein at least one of the plurality of feet comprises an aperture for receiving a lifting device.

18. The pressure washing device of claim 13, further comprising a gas engine or an electric motor in communication with the pump.

\* \* \* \* \*